United States Patent [19]

Rotman et al.

[11] Patent Number: 5,098,725
[45] Date of Patent: Mar. 24, 1992

[54] HEAT STABILIZED FLAVORING AGENTS COATED WITH HYDROGENATED CASTOR OIL

[75] Inventors: Avner Rotman; Yoav Blatt, both of Rehovot, Israel

[73] Assignee: Bio-Dar, Ltd., Rehovot, Israel

[21] Appl. No.: 501,079

[22] Filed: Mar. 29, 1990

Related U.S. Application Data

[63] Continuation-in-part of Ser. No. 373,870, Jun. 30, 1989, abandoned.

[51] Int. Cl.$^5$ ............................................. A23L 1/236
[52] U.S. Cl. ........................................ 426/98; 426/96; 426/548; 426/650
[58] Field of Search ............... 426/96, 98, 650, 651, 426/548

[56] References Cited

U.S. PATENT DOCUMENTS

| | | |
|---|---|---|
| 3,317,433 | 5/1967 | Eichel . |
| 3,389,000 | 6/1968 | Fujita et al. ............... 426/302 |
| 3,796,814 | 3/1974 | Cermak ...................... 426/98 |
| 3,857,556 | 2/1975 | Darragh et al. . |
| 4,384,004 | 5/1983 | Cea et al. .................... 426/3 |
| 4,430,349 | 2/1984 | Malone et al. ............... 426/34 |
| 4,515,769 | 5/1985 | Merritt et al. . |
| 4,576,826 | 3/1986 | Liu et al. . |
| 4,590,075 | 5/1986 | Wei et al. . |
| 4,631,105 | 12/1986 | Callipoulos et al. . |
| 4,704,288 | 11/1987 | Tsao et al. ................... 426/99 |
| 4,711,784 | 12/1987 | Yang ............................ 426/5 |
| 4,722,945 | 2/1988 | Wood et al. . |
| 4,740,376 | 4/1988 | Yang . |
| 4,804,548 | 2/1989 | Sharma et al. ............... 426/96 |
| 4,824,681 | 4/1989 | Schobel et al. . |
| 4,839,184 | 6/1989 | Cherukuri et al. . |
| 4,857,340 | 8/1989 | Parliment et al. . |
| 4,871,558 | 10/1989 | Tackikawa et al. . |

FOREIGN PATENT DOCUMENTS

| | | |
|---|---|---|
| 053844 | 6/1982 | European Pat. Off. . |
| 63-317050 | 4/1989 | Japan . |
| 63-317053 | 4/1989 | Japan . |

*Primary Examiner*—Donald E. Czaja
*Assistant Examiner*—Evan Federman
*Attorney, Agent, or Firm*—Browdy and Neimark

[57] ABSTRACT

Very small particles of flavoring materials which are labile when subjected to both heat and an aqueous medium are coated with a coating material containing hydrogenated castor oil and having a melting point of from about 80° to about 100° C. The coating layer remains stable during the first minutes of the baking process, when the concentration of water in the dough or batter is relatively high. After several minutes, when most of the water in the dough or batter has evaporated and the temperature increases to about 100° C., the coating layer or layers melt away. Within a few minutes thereafter, the active ingredient is exposed within the product. Alternatively, a leavening agent may be used wihtin the capsule which will release a gas at the predetermined temperature and cause rupture of the microencapsulation.

21 Claims, No Drawings

HEAT STABILIZED FLAVORING AGENTS COATED WITH HYDROGENATED CASTOR OIL

This application is a continuation-in-part of Ser. No. 07/373,870, filed June 30, 1989, now abandoned.

FIELD OF THE INVENTION

The present invention relates to a method for stabilizing flavoring agents such as sweeteners and spices during the baking process, and releasing the flavors of these flavoring agents towards the end of the baking process.

BACKGROUND OF THE INVENTION

Flavoring agents, such as sweeteners and spices, are widely used in food products. In some cases, particularly during cooking and baking, some of the flavoring materials are unstable and are destroyed during the cooking process.

One sweetening material that is particularly sensitive to the combination of heat and an aqueous environment is aspartame, the dipeptide sweetener aspartic acid-phenylalanine methylester. Although aspartame is not unstable at elevated temperatures, the combination of an aqueous environment and high temperatures, such as are encountered during baking (about 150°-300° C.) breaks down the dipeptrde molecule and destroys the sweetening ability of the compound.

One method heretofore used for stabilizing food additives is by microencapsulation. However, in most microencapsulation methods, the active ingredient is protected and stabilized not only during preparation, but also remains encapsulated while the food product is being consumed. The food additive agent is then released either in the stomach or intestines, either through diffusion or when the coating layer is dissolved (i.e., in a pH-dependent or other manner). While this method is acceptable for administration of medications or vitamins which need not be available to the consumer until they reach the stomach or intestines, it is unacceptable for flavoring agents, which are designed to be experienced while the food product is in the mouth.

In the case of flavoring agents for foods, it is crucial that the active flavoring ingredient be available to the taste receptors in the mouth and nose at the very beginning of tasting and eating the food product.

Microencapsulation has been used heretofore for protecting flavoring ingredients in foods, although without complete success.

Graves, in U.S. Pat. No. 3,914,439, discloses a dry particulate flavor composition comprising liquid flavoring oils which are absorbed onto sugar crystals which are coated with hydrogenated vegetable oil. The crystals are then sealed with a shellac coating to form a dry, free-flowing particulate flavor compositions. These flavor compositions are used in tea brewing bags, where contact with hot water melts the vegetable oil and releases the flavor.

Eichel, in U.S. Pat. No. 3,317,433, discloses heat rupturable capsules which are used as components in an external embedding substance which will react or combine with the core entity materials when the core materials are released by heat rupture. Examples of this include capsules containing solvents or plasticizers embedded in a solid adhesive film.

Seaborne et al., in U.S. Pat. No. 4,810,534, disclose edible film coating compositions of low moisture permeability comprising crosslinked, refined shellac and an edible member. The coating compositions are useful as a moisture barrier in composite food articles having phases in contact which differ substantially in water activity.

Wurzburg et al., in U.S. Pat. No. 3,091,567, disclose encapsulating agents with controlled water repellency which can contain volatile, relatively water-insoluble flavors or other substances.

Ciliberto et al., in U.S. Pat. No. 4,288,460, disclose a method for protecting granular water-soluble food ingredients which deteriorate upon exposure to the atmosphere by encapsulating these ingredients in a protective coating consisting essentially of a fatty acid derivative selected from the group consisting of polyoxyethylene sorbitan monooleate, polyoxyethylene sorbitan monostearate and lecithin; propylene glycol; and a flow agent such as fumed silica or carboxymethylcellulose. The coated particles have a long shelf life but are substantially instantaneously soluble in water.

Kirn et al., in U.S. Pat. No. 4,710,391, disclose a flavoring agent used to flavor fried foods which is encapsulated so that the flavoring agent can be readily removed from the oil used to fry the food products. A high melting point fat coating on the flavoring agent helps to protect the encapsulant from water and from physical damage prior to and during frying.

Tsau et al, in U.S. Pat. No. 4,704,288, disclose a heat stabilized compositions of aspartame and a partially hydrogenated vegetable oil melting at about 120° F. or above. The particles are formed into 8-40 standard mesh particle size, i.e., from 420 to 2308 microns. Both the type of fat and the particle size are critical to this process.

SUMMARY OF THE INVENTION

It is an object of the present invention to overcome the above-noted deficiencies in the prior art.

It is another object of the present invention to provide a method for heat stabilizing flavoring materials which are labile upon exposure to heat and water at temperatures experienced during cooking or baking.

It is a further object of the present invention to provide a method for heat stabilizing flavoring materials which are labile upon exposure to heat and water during cooking or baking while making the flavoring materials available to the senses immediately upon consumption of foods containing such flavoring materials.

According to the present invention, flavoring materials are coated in such a way that at a certain temperature and after a certain time during preparation of the product, the coating layer is disrupted or disintegrated, and the active ingredient will be exposed to the sensory receptors in the mouth and nose. The present invention thus protects flavoring materials for as long as water is present at high temperatures, allowing release of the materials only after the water has evaporated.

According to the present invention, very small particles of flavoring materials are coated with hydrogenated castor oil or a mixture of hydrogenated castor oil and a compatible coating material so as to form a coating having a melting point of from about 80° to about 100° C. In order to ensure that the active ingredient is evenly incorporated in the matrix to be cooked or baked, the particles are preferably less than 425 $\mu$ in size. Particles of this size or less are evenly distributed in the batter or dough which is to be cooked, and there are not "islands" of exaggerated flavoring in the finished product. The coating layer remains stable during the first minutes of the baking process, when the concentration of water in the dough or batter is relatively high. After several minutes, when most of the water in the dough or batter has evaporated and the temperature increases to about 100° C., the coating layer or layers melt away. Within a few minutes thereafter, the active ingredient is exposed within the product.

Another method for stabilizing flavoring materials during the initial stages of baking involves using gases formed inside the microcapsule during the baking process to disrupt the coating layer. This is achieved by incorporating leavening agents inside of the microcapsules, either as part of the core material or together with the inner part of the coating layer. These leavening agents, such as sodium bicarbonate, ammonium carbonate, and others, release a gas or gases (carbon dioxide, ammonia, etc.) when heated. Thus, these agents are useful in disrupting the coating layer from inside of the capsule once the desired temperature has been reached. The leavening agents can be mixed together with the active flavoring ingredient, or can be added to the coating material and sprayed onto particles of the active ingredient.

The present invention can be used for stabilizing a variety of flavoring ingredients, such as spices, salts, acids, sweetening agents, leavening agents, yeasts, bacteria, dyes, and the like. Microcapsules made according to the present invention can be used in a wide variety of products, but are particularly applicable to baked goods such as cookies, cakes, biscuits, doughnuts, breads, and the like. Microcapsules made according to the present invention can also be used in any foods that are subjected to heat such as from pasturization, including dairy products such as yogurt, flavored cream cheese, and the like.

The process of the present invention can be used for stabilizing flavoring and sweeteners in a variety of environments. For example, when the fragile ingredients such as flavoring agents or sweeteners are used in baked goods, the fragile ingredient is to be protected from water as long as water is present in the batter or dough. When most or substantially all of the water is evaporated during the baking process, the temperature of the dough or batter is increased, the coating material melts, and the fragile ingredient is released.

When fragile ingredients such as flavoring or sweetening ingredients are coated for incorporation in foods such as yogurt, the principle is somewhat different. In this case, the coated ingredient is warmed in the milk which is cultured to form the yogurt at a temperature of about 65° C. for from 1 to 4 hours. During most of this time, the water does not penetrate the capsule, with no resultant degradation of the fragile ingredient. However, when the fermentation process is finished, the yogurt remains at room temperature, and then is refrigerated for approximately another 24 hours. During this time, the fragile ingredient slowly leaks out of the capsules and sweetens or otherwise flavors the yogurt.

DETAILED DESCRIPTION OF THE INVENTION

Flavoring materials can be coated according to the present invention in any acceptable manner, and can be conveniently coated in a modified fluidized bed apparatus. The apparatus can be adapted in such a way that very small particles, i.e., less than 500 $\mu$, can be coated without agglomeration. Unless otherwise noted, all percentages are by weight.

The coating materials which can be used in the present invention melt at temperatures of from about 70°-95° C., and which contain hydrogenated castor oil. The coating materials may be almost exclusively made of hydrogenated castor oil, or may include other compatible coating materials mixed with the hydrogenated castor oil, such as ethylcellulose. The compatible coating materials are chosen so that the melting point of the mixture with hydrogenated castor oil ranges from about 70°-95° C., and which are acceptable for use in food products. Among the compatible coating materials are ethylcellulose, methylcellulose, calcium stearate, food grade stearic acid, and the like. Particularly good results are obtained with coating materials which melt in the range of about 80°-90° C., such as hydrogenated castor oil per se.

It was found that the melting point of the coating material alone does not determine what is a good coating material, as a mixture of calcium stearate and stearic acid, which has a melting point of 86° C., only provided about 60-65% protection for the aspartame in a baking environment. Thus, the presence of hydrogenated castor oil in the coating material is essential.

EXAMPLE 1

Granulation of Aspartame with Polyvinylpyrrolidone (PVP)

Half a kilogram of aspartame, particle size $\approx 20$ microns, was mixed with 150 g. polyvinylpyrrolidone and loaded into a modified Uni-Glatt powder coater. The powder was fluidized at an inlet temperature of about 30° C. and sprayed with 250 ml water over a period of ten minutes. The granulated material was dried for 40 minutes at 40° C. inlet temperature. The granules were sieved, and the fraction (80%) between 50 and 350 microns was used for coating according to the present invention.

EXAMPLE 2

Coating of Aspartame with Hydrogenated Castor Oil (HCO)

Half a kilogram of aspartame from Example 1 was loaded into the Uni-Glatt machine. This material was sprayed with 1400 g of melted hydrogenated castor oil (m.p. 85° C). The inlet temperature was 45° C. and the total amount of the coating was sprayed over a period of 45 minutes. The fluidizing air flow was increased during the process in order to keep the material fluidizing well. The coated material was sieved, and particles below about 500 microns were used in baking.

EXAMPLE 3

Granulation of Aspartame with Polydextrose, Followed by Coating with Hydrogenated Castor Oil Polydextrose A (Pfizer), 500 grams, and 500 grams of aspartame, were mixed and granulated as described in Example 1. Only 150 ml of water was used in order to obtain a similar particle size of about 50-350 microns. Five hundred grams of the granules were coated with 1400 grams of hydrogenated castor oil as shown in Example 2.

EXAMPLE 4

Coating of Aspartame with Hydrogenated Castor Oil and a Mixture of Calcium Stearate and Stearic Acid Using the method of Example 2, 500 grams of granulated aspartame, 50-350 microns in size, were coated with 500 grams of hydrogenated castor oil. A mixture of 250 grams of calcium stearate and stearic acid were mixed together and melted together. The cold solid mixture had a melting point of 86° C. Five hundred grams of the melted mixture was used to coat 500 grams of the HCO-coated granules. The coated material was used in baking to add sweetening to batters and doughs.

EXAMPLE 5

Granulation of Aspartame with Calcium Phosphate and Sodium Bicarbonate and then Coating with HCO Calcium phosphate, 50 grams, and sodium bicarbonate, 50 grams, were milled together to give a very fine powder. This powder was mixed with 500 grams of aspartame and 150 grams of PVP. The mixture was fluidized in a Uni-Glatt powder coater at an inlet temperature of 30° C. The granulation was achieved by spraying 200 ml of water over a period of ten minutes. The granules were dried for one hour at 35° C. The sieved material, 500 grams, was coated with 1400 grams of hydrogenated castor oil as described in Example 2.

EXAMPLE 6

Granulation of Aspartame with Ammonium Carbonate Followed by Coating with HCO Milled ammonium carbonate, 50 grams, 500 grams of aspartame, and 150 grams of PVP were granulated and coated as in Example 5.

EXAMPLE 7

Aspartame Coated with a Suspension of Sodium Bicarbonate and Calcium Phosphate, then Coated with HCO Five hundred grams of granulated aspartame, as in Example 1, were loaded into a Uni-Glatt machine and fluidized at 25° C. Sodium bicarbonate, 25 grams, and 25 grams of calcium phosphate were milled and suspended in 200 grams of partially hydrogenated vegetable oil (m.p. 38° C.) at 40° C. The suspension was sprayed onto the aspartame granules. Twelve hundred grams of melted hydrogenated castor oil was used for a second layer of coating on the same granules.

Example 8

Cookies Made from Aspartame Coated with HCO

Cookies were made from the following ingredients, given in percent by weight:

| Part A | |
|---|---|
| Flour | 49.6 |
| Corn starch | 3.6 |
| Polydextrose A (Pfizer) | 15.4 |
| Sodium chloride | 0.4 |
| Sodium bicarbonate | 0.2 |
| Ammonium carbonate | 0.3 |
| Coated aspartame | 1.1 |
| Part B | |
| Hydrogenated soybean oil, m.p. 38°, whipped by nitrogen | 13.6 |
| Eggs (whole, mixed, frozen) | 2.7 |
| Water | 10.8 |
| Malt (dry) | 1.4 |
| Artificial vanilla flavor | 0.9 |

To make the cookies, the ingredients of Part A were mixed and the ingredients of Part B were creamed together. Part A was added slowly with mixing to part B to obtain a smooth mixture. Round cookies were formed, 5 cm in diameter, 0.5 cm high. The cookies were baked at 240° C. for six minutes. The cookies were sweet to the taste, indicating that the aspartame had not been destroyed by the combination of heat and water.

Analysis

Analysis of these cookies was performed by two methods:
 a Ninhydrin method showed recovery of 90-97% of Aspartame.
HPLC (High performance liquid chromatography) method showed recovery of 90-92% of Aspartame.

EXAMPLE 9

Granulation of Aspartame with Methocel 250 grams of aspartame powder were mixed with 250 grams of Methocel A15LV. The mixture was fluidized and sprayed with 200 ml of water for a period of ten minutes, and the mixtures was dried at 35° C. for a period of twenty minutes. The yield was 94% by weight, and 70% of the particles were in the size range of about 50-300 microns.

EXAMPLE 10

Granulation of Aspartame with Pharmacoat 606

750 grams of aspartame powder were mixed with 250 grams of Pharmacoat 606. The mixture was fluidized and sprayed with 610 ml. water at room temperatures. After sixteen minutes of spraying, the temperature was raised to 40° C., and drying was continued for one hour. The yield of particles was about 95% by weight, and approximately 75% of the material was in the size range of 50-300 microns.

EXAMPLE 11

Coating of Aspartame with Different Fats

Aspartame was coated with a variety of fats to determine if the type of fat used for the coating made a difference in aspartame stability under baking conditions.

a: Glyceryl monostearate (GMS)

Five hundred grams of granulated aspartame (as of Example 10), using the modified fluidized bed machine, were coated with 500 grams of melted glyceryl monostearate. Glyceryl monostearate has a melting point of 65° C.

b: Calcium stearate + Stearic acid

Five hundred grams of granulated aspartame as of Example 10 were coated with a mixture of 300 grams calcium stearate and 200 grams stearic acid, in melted form. The melting point of this mixture of stearic acid and calcium stearate is 86° C.

c: Stearic acid

Five hundred grams of granulated aspartame as in Example 10 were coated with 500 grams of melted stearic acid in the fluidized bed machine. Stearic acid has a melting point of 69° C.

d: Ethyl Cellulose dissolved in Hydrogenated Castor Oil

Five hundred grams of granulated aspartame as of Example 10 were coated with 450 grams of melted hydrogenated castor oil in which 50 grams of ethyl cellulose (Ethocel 4) were dissolved. The coating was performed in a modified fluidized bed machine.

e: Coating of Compacted Aspartame

Five hundred grams of compacted aspartame (80–250 μl) was coated with hydrogenated castor oil as described in Example 2.

The coated aspartame as described above was used in cookies baked according to example 8 as a sweetener, and the rate of recovery of the aspartame in the baked cookies was measured. The results are shown in the table below:

| Coating | % Aspartame Recovery |
| --- | --- |
| Glyceryl monostearate | 55–60 |
| Stearic acid | 45–48 |
| Calcium stearate/stearic acid | 60–65 |
| Hydrogenated Castor Oil | 90–95 |
| Ethyl Cellulose Dissolved in Hydrogenated Castor Oil | 90–97 |

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A food product consisting of a flavoring material microencapsulated in a coating material, wherein said flavoring material is one which is labile upon exposure to heat and water and said coating material contains hydrogenated castor oil, said food product including protection means for preventing release of said flavoring material until a temperature is reached for sufficient time to remove a substantial amount of the water which is present when the food product is used in foodstuffs having an aqueous component and requiring processing at elevated temperatures and for thereafter releasing the flavoring material during the processing at elevated temperatures.

2. A food product in accordance with claim 1, wherein said flavoring material is a sweetening agent.

3. A food product in accordance with claim 2, wherein said sweetening agent is aspartame.

4. A food product in accordance with claim 1, wherein said predetermined temperature is from about 60° to about 300° C.

5. A food product in accordance with claim 1, wherein said coating material is selected such that it melts or otherwise disintegrates at or above a temperature below which said protection means prevents release of said flavoring material, and wherein said protection means comprises said coating material.

6. A food product in accordance with claim 5, wherein said temperature is from about 60° to about 300° C.

7. A food product in accordance with claim 5, wherein said coating material consists essentially of hydrogenated castor oil.

8. A food product in accordance with claim 1, wherein said coating material is selected from the group consisting of hydrogenated castor oil and mixtures of hydrogenated castor oil with compatible coating materials.

9. A food product in accordance with claim 8 wherein said compatible coating material is ethylcellulose.

10. A food product in accordance with claim 1 further including a compound, within the microcapsule or part of said coating material, which releases a gas at or above said temperature below which said protection means prevents release of said flavoring material, and wherein said protection means comprises said compound.

11. A food product in accordance with claim 10, wherein said compound which releases a gas is selected from the group consisting of sodium bicarbonate and ammonium carbonate.

12. A food product in accordance with claim 1, wherein said coating material includes two layers.

13. A food product in accordance with claim 1, having a diameter of about 425 μ or less.

14. A food product in accordance with claim 1, wherein the temperature sufficient to remove a substantial amount of water is from about 70° to about 100° C.

15. A food product in accordance with claim 5, wherein the temperature sufficient to remove a substantial amount of water is from about 70° to about 100° C.

16. A food product in accordance with claim 1, wherein the temperature sufficient to remove a substantial amount of water is from about 80° to about 90° C.

17. A food product in accordance with claim 5, wherein the temperature sufficient to remove a substantial amount of water is from about 80° to about 90° C.

18. In the method of cooking or baking foodstuffs having ingredients which include aqueous substances and a flavoring material comprising assembling said ingredients and cooking or baking, the improvement wherein the flavoring material is one which is labile upon exposure to heat and water and whereby said flavoring material is protected from exposure to heat in an aqueous environment during the cooking or baking, comprising using as said flavoring material a food product in accordance with claim 1, wherein said protection means is selected so as to permit release of the flavoring material during cooking or baking after substantial evaporation of the aqueous portion of the ingredients.

19. A method in accordance with claim 18 wherein said coating material is selected such that it melts or otherwise disintegrates at a temperature at or above said temperature below which said protection means prevents release of said flavoring material, and wherein said protection means comprises said coating material.

20. A method in accordance with claim 18 wherein said food product further includes a compound, within the microcapsule or part of said coating material, which releases a gas at or above said temperature below which said protection means prevents release of said flavoring material, and wherein said protection means comprises said compound.

21. A method in accordance with claim 18 wherein said flavoring material is aspartame.

* * * * *